(12) United States Patent
Hsu et al.

(10) Patent No.: US 10,658,860 B2
(45) Date of Patent: *May 19, 2020

(54) ELECTRONIC DEVICE, CHARGER WITHIN THE ELECTRONIC DEVICE, AND DETECTING METHOD FOR DETECTING ABNORMAL STATUS OF CONNECTOR OF ELECTRONIC DEVICE

(71) Applicant: MEDIATEK INC., Hsin-Chu (TW)

(72) Inventors: Chih-Yuan Hsu, Hsinchu (TW); Yu-Yuan Kuo, Hsinchu (TW); Chi-Ming Lee, Hsinchu (TW); Shih-Ming Chen, Hsinchu (TW)

(73) Assignee: MEDIATEK INC., Hsin-Chu (TW)

(*) Notice: Subject to any disclaimer, the term of this patent is extended or adjusted under 35 U.S.C. 154(b) by 0 days.

This patent is subject to a terminal disclaimer.

(21) Appl. No.: 16/214,150

(22) Filed: Dec. 10, 2018

(65) Prior Publication Data

US 2019/0109480 A1    Apr. 11, 2019

Related U.S. Application Data

(63) Continuation-in-part of application No. 15/006,129, filed on Jan. 26, 2016, now Pat. No. 10,181,742.

(Continued)

(51) Int. Cl.
*H02J 7/00* (2006.01)
*G05F 1/56* (2006.01)
*H01R 13/52* (2006.01)

(52) U.S. Cl.
CPC .............. *H02J 7/0072* (2013.01); *G05F 1/56* (2013.01); *H01R 13/52* (2013.01); *H02J 7/00* (2013.01);

(Continued)

(58) Field of Classification Search
CPC ...... H02J 7/0072; H02J 7/0029; H02J 7/0036; H02J 7/0052; H02J 2007/0037;

(Continued)

(56) References Cited

U.S. PATENT DOCUMENTS

2007/0136025 A1    6/2007   Lo
2010/0201308 A1    8/2010   Lindholm
(Continued)

FOREIGN PATENT DOCUMENTS

| CN | 2877107 Y   | 3/2007  |
| CN | 102231549 A | 11/2011 |
| CN | 103187769 A | 7/2013  |

*Primary Examiner* — Nathaniel R Pelton
(74) *Attorney, Agent, or Firm* — Winston Hsu

(57) ABSTRACT

An electronic device includes: a connector, arranged for coupling to a power supply external to the electronic device, wherein the power supply is arranged to provide a supply voltage to the electronic device to charge a battery of the electronic device; and a charger, coupled to the connector and selectively operated in a normal mode or a self-test mode, wherein when the charger operates in the normal mode, the charger is arranged for receiving the supply voltage via a power pin of the connector to charge the battery of the electronic device; and when the charger operates in the self-test mode, the charger provides a specific voltage to the power pin of the connector. The charger includes a detector to detect the current or voltage of at least one pin of the connector to generate a detecting result, and the supply voltage is set based on the detecting result.

26 Claims, 8 Drawing Sheets

Related U.S. Application Data

(60) Provisional application No. 62/161,880, filed on May 14, 2015.

(52) U.S. Cl.
CPC .......... *H02J 7/0029* (2013.01); *H02J 7/0036* (2013.01); *H02J 7/00302* (2020.01); *H02J 7/00304* (2020.01)

(58) Field of Classification Search
CPC ...... H02J 2007/0039; H02J 2007/0062; G05F 1/56; H01R 13/52
USPC ........................................................ 320/162
See application file for complete search history.

(56) References Cited

U.S. PATENT DOCUMENTS

| | | | |
|---|---|---|---|
| 2011/0018522 A1* | 1/2011 | Li | H02J 7/0052 323/318 |
| 2011/0025262 A1 | 2/2011 | Fischer | |
| 2011/0181104 A1 | 7/2011 | Kamaga | |
| 2012/0119696 A1 | 5/2012 | Picard | |
| 2012/0153993 A1 | 6/2012 | Xie | |
| 2013/0082644 A1 | 4/2013 | Gagne | |
| 2013/0154547 A1 | 6/2013 | Wada | |
| 2013/0181675 A1 | 7/2013 | Kawasaki | |
| 2013/0271107 A1 | 10/2013 | Grossier | |
| 2014/0015476 A1 | 1/2014 | Kondo | |
| 2015/0048804 A1 | 2/2015 | Toivanen | |
| 2016/0098688 A1* | 4/2016 | Hunt | G06Q 20/18 705/308 |

\* cited by examiner

ELECTRONIC DEVICE, CHARGER WITHIN THE ELECTRONIC DEVICE, AND DETECTING METHOD FOR DETECTING ABNORMAL STATUS OF CONNECTOR OF ELECTRONIC DEVICE

CROSS REFERENCE TO RELATED APPLICATION

This application is a Continuation In Part of U.S. application Ser. No. 15/006,129, which was filed on Jan. 26, 2016 and claims priority of U.S. Provisional Application No. 62/161,880, filed on May 14, 2015.

BACKGROUND

When a charger connector of an electronic device is damaged, foreign objects such as dust, metal scraps or lead are present on the charger connector, or there is liquid between the charger connector pins, a leakage current generated when the electronic device is charged by a power adapter may cause a temperature of the charger connector to increase, causing danger to the user.

In particular, because the leakage current is generated at the charger connector, a protection circuit within a charger IC within the electronic device cannot provide adequate protection by detecting or avoiding this leakage current issue. In addition, because the leakage current generally occurs when the cable of the power adapter connects to the charger connector of the electronic device, and the leakage current is seldom generated when no plug connects to the charger connector, how to design circuits to detect and protect the charger connector is difficult, and is an important topic in this field.

SUMMARY

It is therefore an objective of the present invention to provide a detecting method for detecting abnormal status of the charger connector of the electronic device, to solve the above-mentioned problems.

According to one embodiment of the present invention, an electronic device is provided comprising: a connector, arranged for coupling to a power supply external to the electronic device, wherein the power supply is arranged to provide a supply voltage to the electronic device to charge a battery of the electronic device; and a charger, coupled to the connector and selectively operated in a normal mode or a self-test mode, wherein when the charger operates in the normal mode, the charger is arranged for receiving the supply voltage via a power pin of the connector to charge the battery of the electronic device; and when the charger operates in the self-test mode, the charger provides a specific voltage to the power pin of the connector. The charger includes a detector to detect the current or voltage of at least one pin of the connector to generate a detecting result, and the supply voltage is set based on the detecting result.

According to another embodiment of the present invention, a charger is provided, wherein the charger is arranged to be positioned in an electronic device and coupled to a connector of the electronic device, and coupled to a power supply external to the electronic device. The charger is selectively operated in a normal mode or a self-test mode, wherein when the charger operates in the normal mode, the charger is arranged for receiving a supply voltage from the power supply via a power pin of the connector to charge a battery of the electronic device; and when the charger operates in the self-test mode, the charger provides a specific voltage to the power pin of the connector, wherein the charger includes a detector to detect the current or voltage of at least one pin of the connector to generate a detecting result, and the supply voltage is set based on the detecting result.

According to another embodiment of the present invention, a detecting method of an electronic device is provided, wherein the electronic device comprises a connector arranged for coupling to a power supply external to the electronic device, wherein the power supply is arranged to provide a supply voltage to the electronic device via a power pin of the connector to charge a battery of the electronic device. The detecting method comprises: operating in a self-test mode and detecting a voltage or a current of at least one pin of the connector to generate a detecting result; and setting the supply voltage based on the detecting result.

According to another embodiment of the invention, an electronic device is provided, and the electronic device comprises: a connector, arranged for coupling to a power supply external to the electronic device, wherein the power supply is arranged to provide a supply voltage to the electronic device to charge a battery of the electronic device; a charger, coupled to the connector and selectively operated in a normal mode or a self-test mode, for receiving the supply voltage via a power pin of the connector to charge the battery when the charger operates in the normal mode; a transistor, having a gate electrode, a first electrode and a second electrode, wherein the gate electrode is controlled by a control signal provided by the charger, the first electrode is coupled to a ground pin of the connector, and the second electrode is coupled to a ground of the electronic device; and a resistor, coupled between the ground pin of the connector and the ground of the electronic device. When the charger operates in the self-test mode, the charger provides a specific voltage to the power pin of the connector the charger includes a detector to detect the current or voltage of at least one pin of the connector to generate a detecting result, and the supply voltage is set based on the detecting result.

When the detecting result is within a first range, the supply voltage is set to be a first value, when the detecting result is within a second range, the supply voltage is set to be 5V, when the detecting result is within a third range, the supply voltage is set to be in a range between 0 and 5V, and when the detecting result is above a threshold, the supply voltage is set to be 0V.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
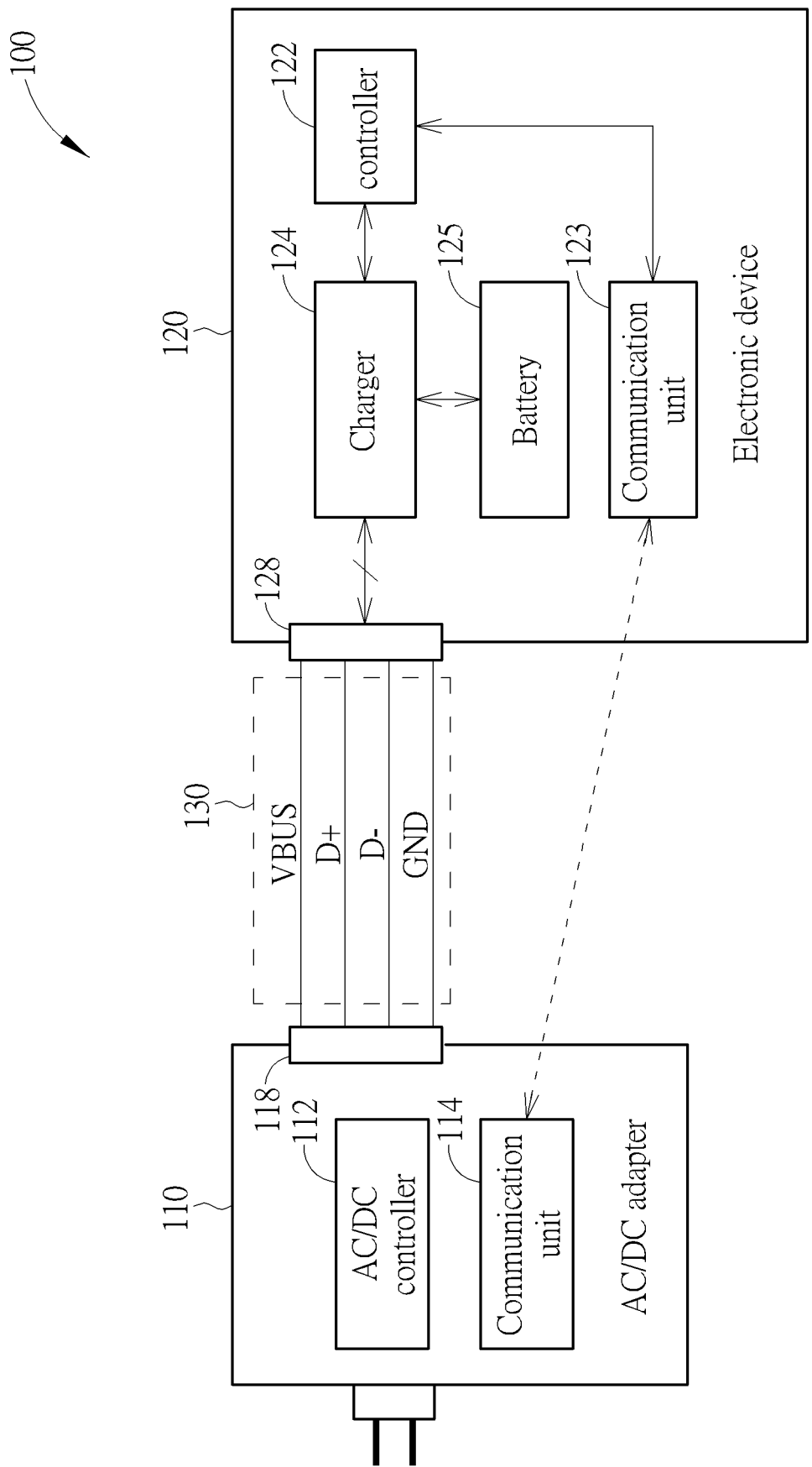
FIG. 1 is a diagram illustrating a charging system according to one embodiment of the present invention.

Please refer to FIG. 1, which is a diagram illustrating a charging system 100 according to one embodiment of the present invention. As shown in FIG. 1, the charging system 100 comprises a power supply (in this embodiment, the power supply is an AC-DC adapter 110, but this is not a limitation of the present invention, and the power source may be a Universal Serial Bus (USB) host in other embodiments) and an electronic device 120, where the AC-DC adapter 110 is connected to the electronic device 120 via a cable 130, and the AC-DC adapter 110 provides at least a supply voltage VBUS, aground voltage GND and data D+ and D− to the electronic device 120. In this embodiment, the electronic device 120 may be a portable device such as a cell phone, smart phone, tablet . . . etc. or any other electronic device required to be charged by a power adapter or USB host.

The AC-DC adapter 110 comprises an AC-DC controller 112, a communication unit 114 and a connector 118, where the AC-DC controller 112 is arranged to receive external AC power to generate the stable supply voltage VBUS, the communication unit 114 is arranged to communicate with the electronic device 120, and the connector 118 satisfies the USB standards and has four pins for providing VBUS, D+, D− and GND. In addition, the electronic device 120 comprises a controller 122, a communication unit 123, a charger 124, a battery 125 and a connector 128. The controller 122 is arranged to control the charger 124 and perform some operations of the electronic device 120, and the charger 124 is arranged to charge the battery 125 according to the supply voltage VBUS provided by the AC-DC adapter 110 or provide a specific voltage to the connector 128. The communication unit 123 is arranged to communicate with the AC-DC adapter 110, and the connector 128 satisfies the USB standards and has four pins for receiving VBUS, D+, D− and GND.

In this embodiment, the AC-DC controller 112 has a USB interface; however, the AC-DC controller 112 may have another interface such as USB power delivery (USB PD), USB D+/D− or any other suitable interface in other embodiments. The circuits within the AC-DC adapter 110 may have an inter-integrated circuit (I2C) interface or a one wire (1-Wire) interface or any other suitable interface. In addition, the electronic device 120 has bi-directional communication with the AC-DC adapter 110. In this embodiment, the communication unit 116 and the communication unit 123 may have any suitable wireless communication interface such as Bluetooth (BT) or Bluetooth Low Energy (BT BLE).

Figure 2:
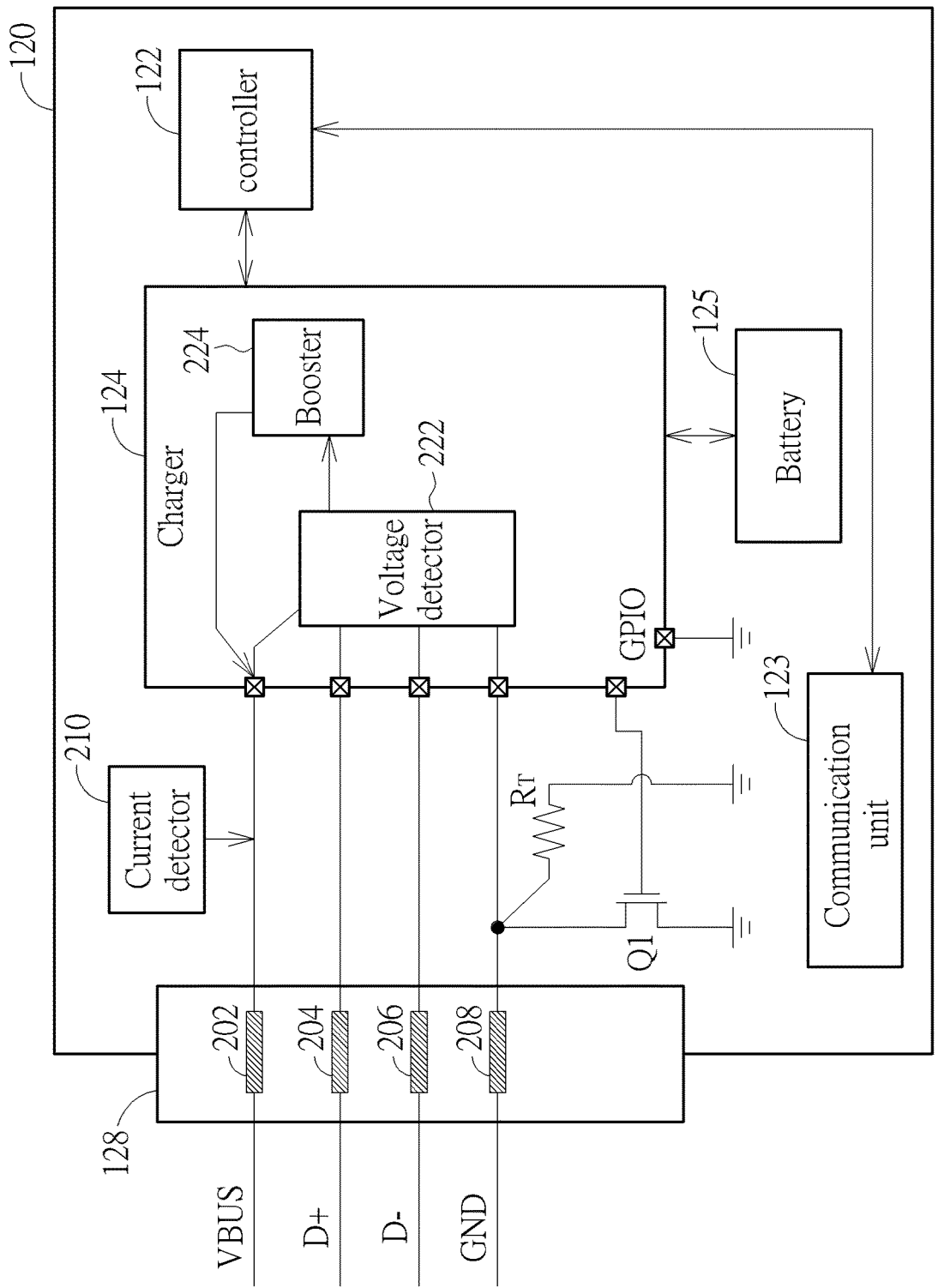
FIG. 2 is a diagram illustrating a detailed structure of the electronic device according to one embodiment of the present invention.

Please refer to FIG. 2, which is a diagram illustrating a detailed structure of the electronic device 120 according to one embodiment of the present invention. As shown in FIG. 2, the connector 128 comprises a VBUS pin 202 and a GND pin 208 (power pins) for receiving the supply voltage VBUS and the ground voltage GND, and a D+ pin 204 and a D− pin 206 (data pins) for receiving data D+ and D− from the AC/DC adapter 110; the charger 124 comprises a voltage detector 222 and a booster 224; and the electronic device 120 further comprises a current detector 210, a transistor Q1 and a resistor RT, where the gate electrode of the transistor Q1 is coupled to a general purpose input/output (GPIO) pin, a drain electrode of the transistor Q1 is coupled to the power pin 208, and the source electrode of the transistor Q1 is coupled to a system ground; and the resistor RT is coupled between the power pin 208 and the GPIO pin. It is noted that FIG. 2 merely shows the elements related to the present invention; a person skilled in the art should understand that the electronic device 120 and the charger 124 have other elements for the general functions.

The elements shown in FIG. 2 are used to detect whether the connector 128 has abnormal status, where the abnormal status is a leakage current occurred in the connector 128, and the leakage current may be caused by foreign objects such as dust, metal scraps, lead or liquid. Particularly, the detecting method can be implemented no matter whether the connector 128 is coupled to the AC/DC adapter 110 or not (i.e. no matter whether the electronic device 120 is charged or not). Generally, the foreign object may be on a path between the VBUS pin 202 and GND pin 208, or on a path between the VBUS pin 202 and one of the D+ pin 204 and D− pin 206, and the embodiments of detection methods for these two cases are provided in the following descriptions.

Figure 3:
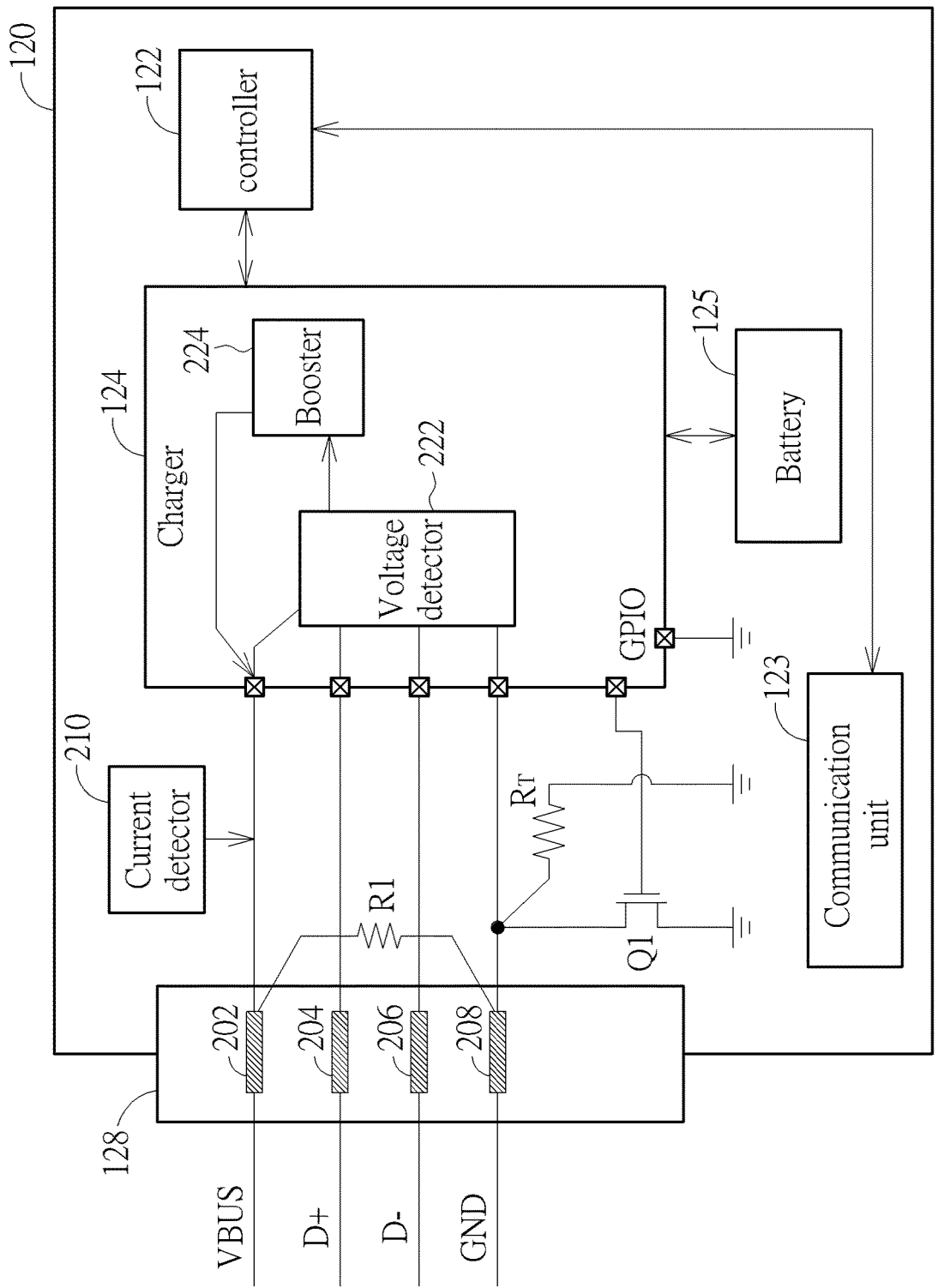
FIG. 3 is a diagram illustrating a foreign object (i.e. resistor R1) on the path between VBUS pin and GND pin.
Figure 4:
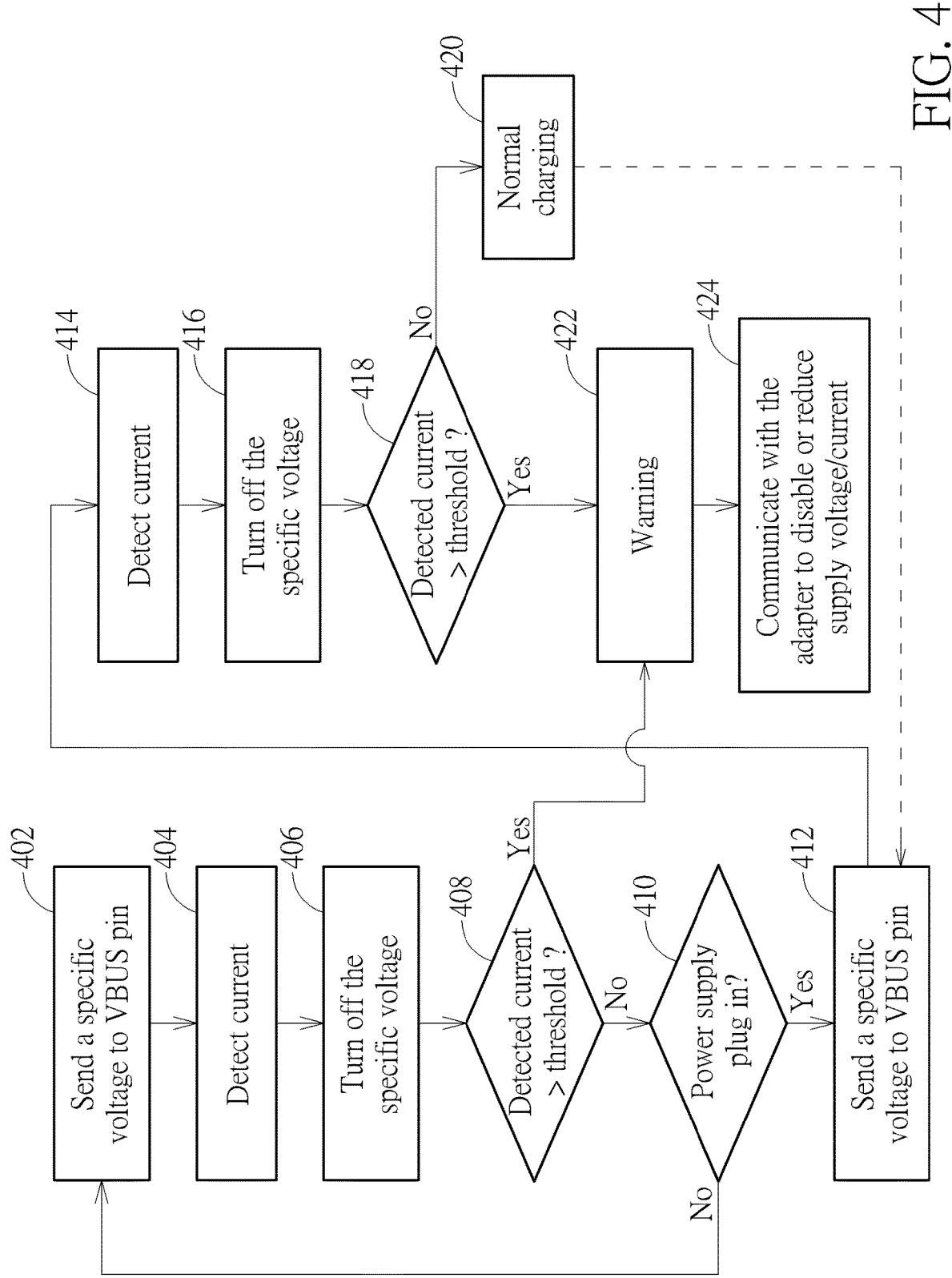
FIG. 4 is a flowchart of a detecting method according to one embodiment of the present invention.

Refer to FIG. 3 and FIG. 4 together, where FIG. 3 is a diagram illustrating a foreign object (i.e. resistor R1) on the path between VBUS pin 202 and GND pin 208, and FIG. 4 is a flowchart of a detecting method according to one embodiment of the present invention. In Step 402, the connector 128 does not couple to the AC/DC adapter 110 via the cable 130, the charger 124 operates in a first self-test mode, and the booster 224 receives a battery voltage provided by the battery 125 and sends a specific voltage to the VBUS pin 202 of the connector 128. In Step 404, the current detector 210 detects a current of a path within the connector 128 or a path between the VBUS pin 202 and the charger 124 to generate a detected current, where the current is generated according to the specific voltage. In Step 406, the booster 224 turns off the specific voltage to save power. In Step 408, the current detector 210 determines whether the detected current is greater than a threshold (e.g. 50 mA) or not. If the detected current is greater than the threshold, the flow enters Step 422 to show a warning message, make a noise, or vibrate to notify the user that the connector 128 may suffer an overheating problem; and if the detected current is not greater than the threshold, the flow enters Step 410.

In Step 410, the charger 124 determines whether a power supply (e.g. cable of the power adapter or USB host) plugs into the connector 128. If yes, the flow enters Step 412; and if not, the flow enters Step 402 again to periodically detect the abnormal status of the connector 128. In addition, in Step 412, because the connector 128 is coupled to the AC/DC adapter 110, and the VBUS pin 202 of the connector 128 has a supply voltage (e.g. 5V) provided by the AC/DC adapter 110, at this time the booster 224 will receive the battery voltage provided by the battery 125 and send a specific voltage greater than the supply voltage provided by the AC/DC adapter 110 to the VBUS pin 202. In detail, in Step 412, the voltage detector 222 detects a voltage level of the VBUS pin 202, and the booster 224 refers to the detected voltage level of the VBUS pin 202 to generate the specific voltage by adding an offset, for example, if the detected voltage level of the VBUS pin 202 is 5V, the specific voltage may be 5.3V or 5.5V. In addition, it is noted that the specific voltage recited in Step 412 may be different from the specific voltage recited in Step 402.

In Step 414, the current detector 210 detects a current of the path within the connector 128 or the path between the VBUS pin 202 and the charger 124 to generate a detected current, where the current is generated according to the specific voltage. In Step 416, the booster 224 turns off the specific voltage to save power. In Step 418, the current detector 210 determines whether the detected current is greater than a threshold (e.g. 50 mA) or not. If the detected current is greater than the threshold, the flow enters Step 422 to show a warning message, make a noise, or vibrate to notify the user that the connector 128 may suffer an overheating problem; and if the detected current is not greater than the threshold, the flow enters Step 420.

In Step 420, the charger 124 switches to operate in the normal mode, where the charger 124 receives the supply voltage provided by the AC/DC adapter via the cable 130 and the connector 128 to charge the battery 125, then the flow enters Step 412 again to periodically detect the abnormal status of the connector 128. In addition, in Step 424, because the connector 128 may suffer an overheating problem, the charger 124 may notify the controller 122 to communicate with the AC/DC adapter 110 to disable or reduce the supply voltage and/or supply current.

In more detail, the charger 124 can refer to the current detected in Step 414 to determine whether to disable or reduce the supply voltage and/or supply current, and can further refer to a range of the detected current to determine by how much the supply voltage and/or supply current should be reduced. When the detected current falls within a first range, the supply voltage and/or supply current can be set to be a first value. When the detected current falls within a second range, the supply voltage and/or supply current can be set to be 5V. When the detected current falls within a third range, the supply voltage and/or supply current can be set to be in a range between 0V and 5V. Finally, when the detected current is above a threshold (which may be different from the threshold in Step 418), the charger 124 notifies the controller 122 to communicate with the AC/DC adapter 110 to disable the supply voltage and/or supply current. Please note that the first range may encompass at least one or both of the second range and third range.

Figure 5:
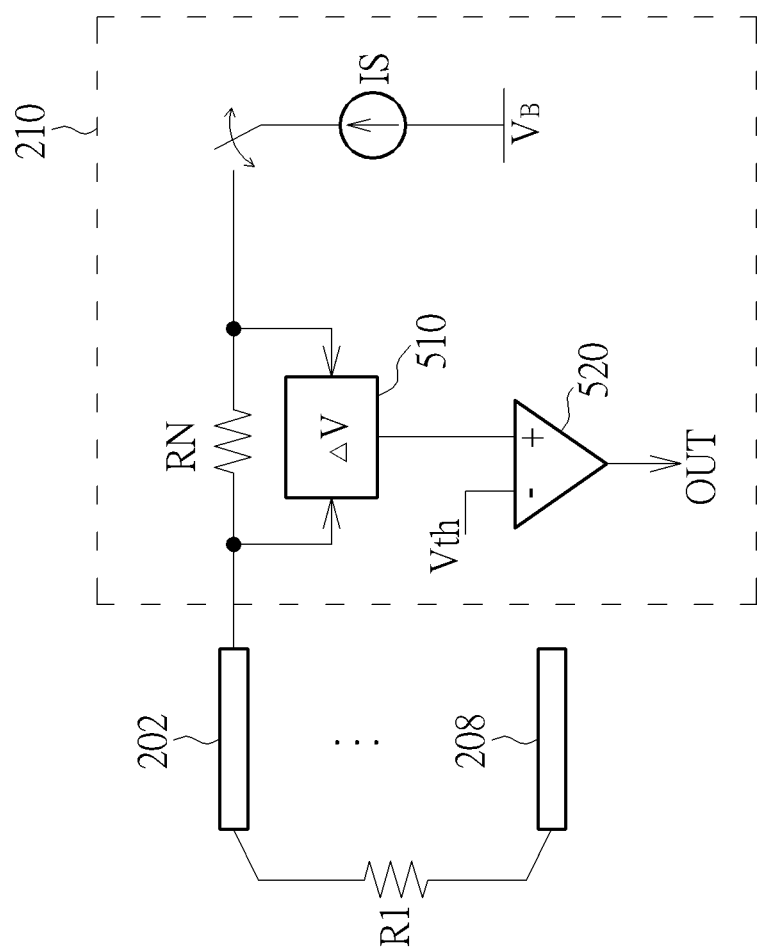
FIG. 5 shows the current detector shown in FIGS. 2 and 3 according to one embodiment of the present invention.

FIG. 5 shows the current detector 210 shown in FIGS. 2 and 3 according to one embodiment of the present invention. As shown in FIG. 5, the current detector 210 comprises a current source IS, a resistor RN, a subtractor 510 and a comparator 520. In detail, when the charger 124 operates in the first self-test mode, the charger 120 generates the specific voltage VB to the current source IS, and the subtractor 510 calculates a voltage difference between two terminals of the resistor RN, where the voltage difference represents the current flowing through the resistor RN, VBUS pin 202, the resistor R1 and the GND pin 208. Then, the comparator compares the voltage difference with the threshold Vth to generate a detecting result OUT. It is noted that the embodiment shown in FIG. 5 is for illustrative purposes only, and not a limitation of the present invention. In other embodiments, the resistor RN can be placed between the VBUS pin 202 and the GND pin 208, or placed on a current path flowing through the resistor R1.

Figure 6:
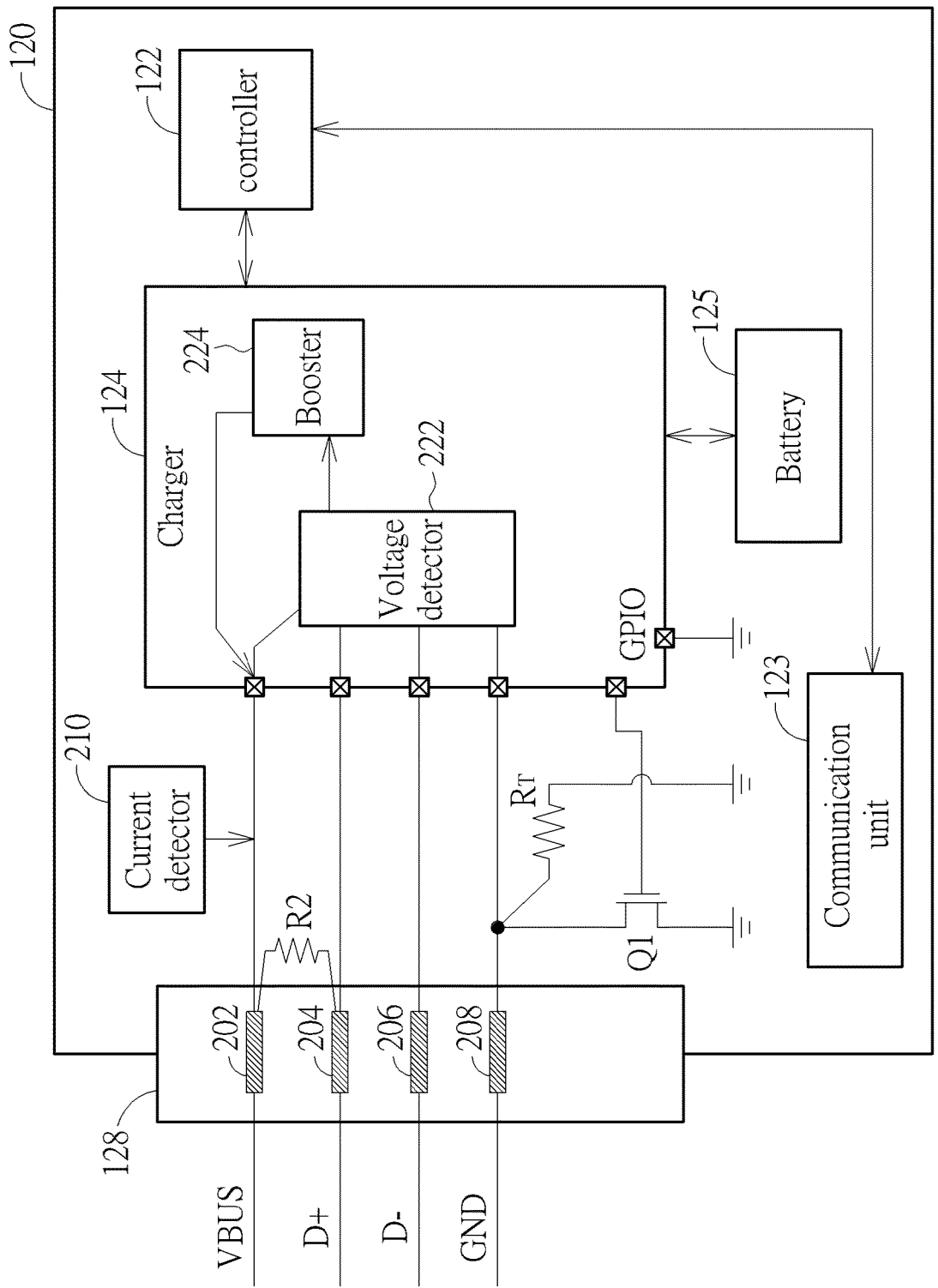
FIG. 6 is a diagram illustrating a foreign object (i.e. resistor R2) on the path between VBUS pin and D+ pin.
Figure 7:
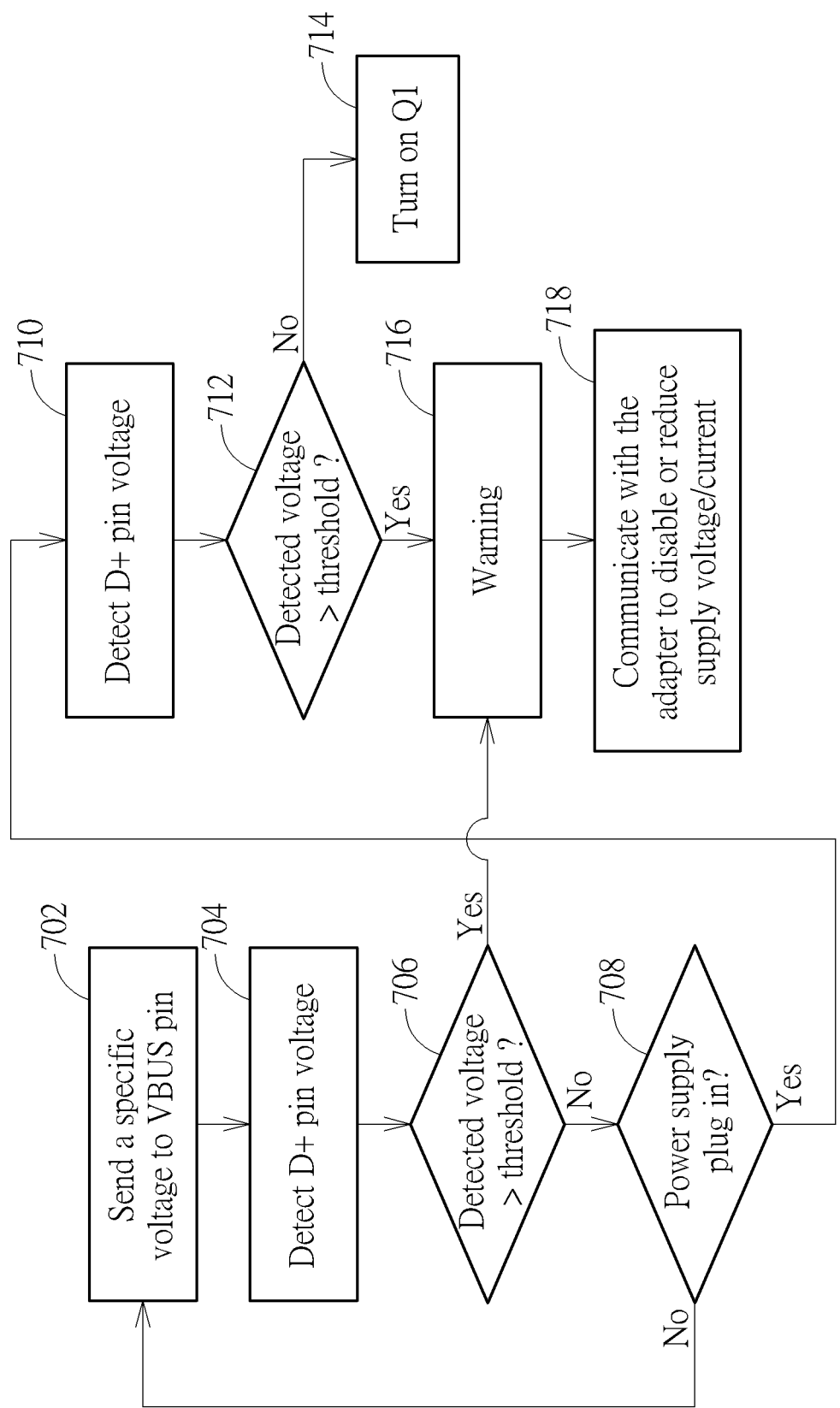
FIG. 7 is a flowchart of a detecting method according to another embodiment of the present invention.

Refer to FIG. 6 and FIG. 7 together, where FIG. 6 is a diagram illustrating a foreign object (i.e. resistor R2) on the path between VBUS pin 202 and D+ pin 204, and FIG. 7 is a flowchart of a detecting method according to another embodiment of the present invention. In Step 702, the connector 128 does not couple to the AC/DC adapter 110 via the cable 130, the charger 124 operates in a second self-test mode, the transistor Q1 is turned off (default status), and the booster 224 receives a battery voltage provided by the battery 125 and sends a specific voltage (e.g. 5V or 3.3V) to the VBUS pin 202 of the connector 128. In Step 704, the voltage detector 222 detects the voltage level of the D+ pin 204. In Step 706, the voltage detector 222 determines whether the detected voltage is greater than a threshold (e.g. 3.3V) or not. If the detected voltage is greater than the threshold, the flow enters Step 716 to show a warning message, make a noise, or vibrate to notify the user that the connector 128 may suffer an overheating problem; and if the detected voltage is not greater than the threshold, the flow enters Step 708.

In detail, if there is no foreign object between the VBUS pin 202 and D+ pin 204, the resistor R2 does not exist, and the voltage level of the D+ pin 204 should be small. If, however, there is no foreign object between the VBUS pin 202 and D+ pin 204, a current path between the VBUS pin 202 and the D+ pin 204 is generated due to the resistor R2, causing the higher voltage level of the D+ pin 204. Therefore, by detecting the voltage level of the D+ pin 204, the possible overheating problem can be known and prevented.

In Step 708, the charger 124 determines whether a power supply (e.g. cable of the power adapter or USB host) plugs into the connector 128. If yes, the flow enters Step 710; and if not, the flow enters Step 702 again to periodically detect the abnormal status of the connector 128. In addition, in Step 710, because the connector 128 is coupled to the AC/DC adapter 110, and the VBUS pin 202 of the connector 128 has a supply voltage (e.g. 5V) provided by the AC/DC adapter 110, at this time the voltage detector 222 can directly detect the abnormal status of the connector 128 by detecting the voltage level of the D+ pin 204 (i.e. the booster 224 does not need to provide the specific voltage to the VBUS pin 202). In Step 712, the voltage detector 222 determines whether the detected voltage is greater than the threshold (e.g. 3.3V) or not. If the detected voltage is greater than the threshold, the flow enters Step 716 to show a warning message, make a noise, or vibrate to notify the user that the connector 128 may suffer an overheating problem; and if the detected voltage is not greater than the threshold, the flow enters Step 714.

In Step 714, the charger 124 switches to operate in the normal mode, where the charger 124 turns on the transistor Q1 to make the GND pin 208 connect to the system ground of the electronic device 120. In addition, in Step 718, because the connector 128 may suffer an overheating problem, the charger 124 may notify the controller 122 to communicate with the AC/DC adapter 110 to disable or reduce the supply voltage and/or supply current.

In more detail, the charger 124 can refer to the D+ pin voltage detected in Step 710 to determine whether to disable or reduce the supply voltage and/or supply current, and can further refer to a range of the detected voltage to determine by how much the supply voltage and/or supply current should be reduced. When the detected voltage falls within a first range, the supply voltage and/or supply current can be set to be a first value. When the detected voltage falls within a second range, the supply voltage and/or supply current can be set to be 5V. When the detected voltage falls within a third range, the supply voltage and/or supply current can be set to be in a range between 0V and 5V. Finally, when the detected voltage is above a threshold (which may be different from the threshold in Step 712), the charger 124 notifies the controller 122 to communicate with the AC/DC adapter 110 to disable the supply voltage and/or supply current. Please note that the first range may encompass at least one or both of the second range and third range.

In the embodiment shown in FIG. 6, the resistor R4 is designed to have large resistance (e.g. several mega ohms), and the transistor Q1 and the resistor R4 are arranged to limit the current flowing through the D+ pin 204 and neighboring path to protect the connector 128 while the cable 130 is plugged in. In detail, refer to FIG. 8. Initially, the transistor Q1 is turned off, and when the cable plugs in and the VBUS pin 202 receives the supply voltage (e.g. 5V) provided by the AC/DC adapter 110, a current path 802 is from the VBUS pin 202, resistor R2, D+ pin 204, GPIO pin of the charger 124, system ground and resistor RT to the GND pin 208. Because the resistor R4 is designed to have large resistance, the current on this current path can be limited to be a safe value (e.g. less than 25 mA), and the connector 128 may not suffer an overheating problem. In addition, the transistor Q1 is turned on when the charger 124 and/or the controller 122 confirm that the connector 128 is safe.

Figure 8:
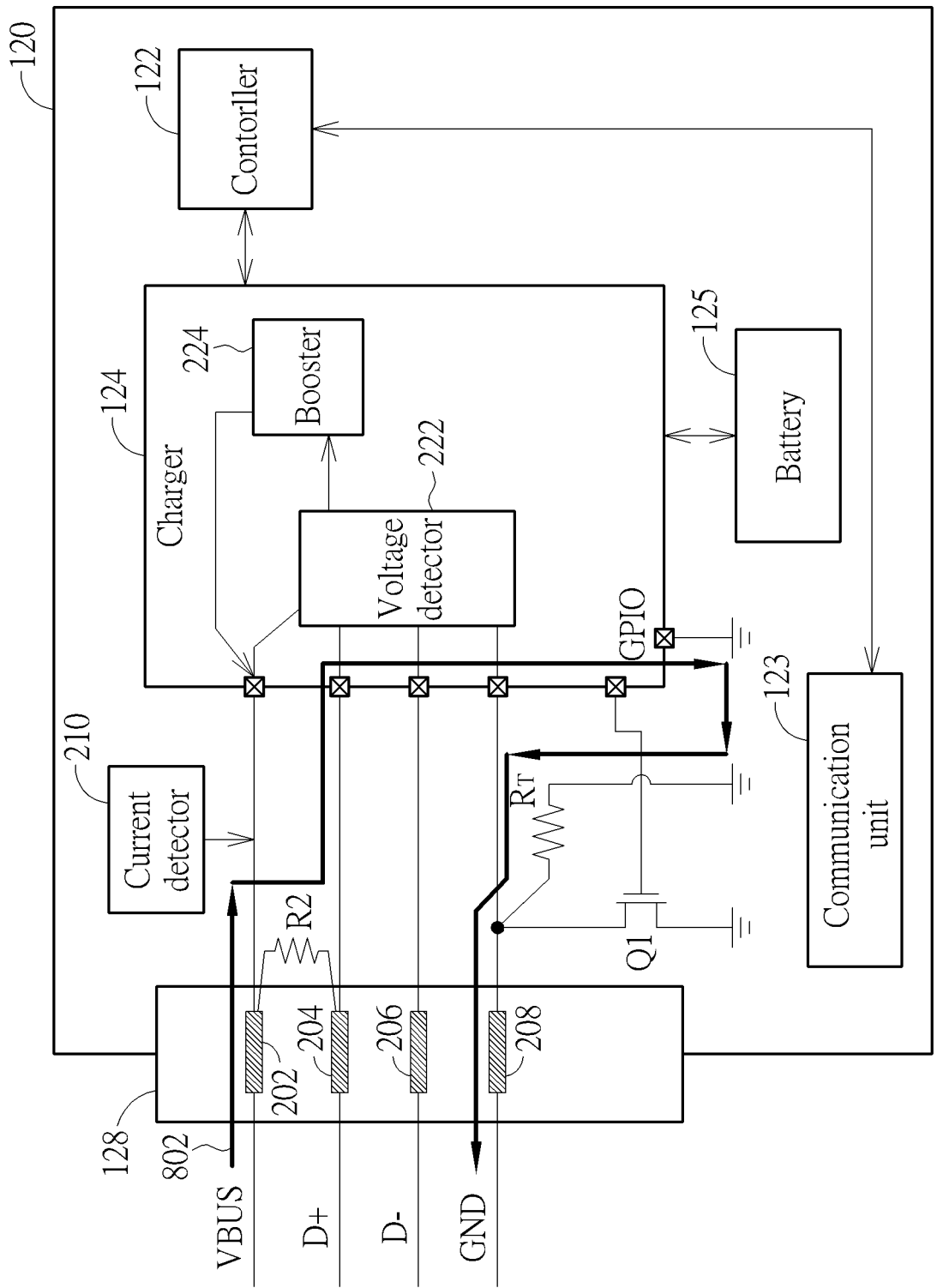
FIG. 8 shows a current path when the transistor Q1 is turned off.

In addition, in the embodiment shown in FIGS. 6-8, the voltage detector 222 determines whether the connector 128 has an abnormal status by detecting the voltage level of the D+ pin 204. A person skilled in the art should understand, however, that the voltage detector 222 may also detect the voltage level of the D− pin 204 to judge if a foreign object is between the VBUS pin 202 and the D− pin 206. In addition, when the connector 128 complies with the USC type-C standard, the voltage detector 222 may also detect the voltage level of any one of the non-power pins such as TX1, CC1, SBU1, RX2-, RX1-, SBU2, CC2, TX2- to judge if a foreign object is between the power pin and non-power pin. These alternative designs shall fall within the scope of the present invention.

In the above-mentioned embodiments, both the leakage current path (caused by the resistor R1) between the VBUS pin 202 and the GND pin 208 and the leakage current path (caused by the resistor R2) between the VBUS pin 202 and the D+ pin 204 can be detected. The user can then be notified if the connector 128 has any abnormal status. In other embodiments, however, the electronic device 120 may be designed to implement only a portion of the circuits shown in FIG. 2 to execute one of the embodiments shown in FIG. 4 and FIG. 7 only. These alternative designs shall fall within the scope of the present invention.

In addition, in the embodiments shown in FIGS. 3-5, the charger 124 periodically (e.g. every minute, ten minutes or hour) enters the first self-test mode no matter whether the AC/DC adapter 110 is coupled to the connector 128 of the electronic device 120 or not. In other embodiments, however, the charger 124 may enter the first self-test mode according to an arranged schedule or by the user's input/control, or the charger 124 may enter the first self-test mode only when no cable plugs into the connector 128, or the charger 124 may enter the first self-test mode only when the AC/DC adapter 110 is coupled to the connector 128. Similarly, in the embodiments shown in FIGS. 6-8, the charger 124 also periodically (e.g. every minute, ten minutes or hour) enters the second self-test mode no matter whether the AC/DC adapter 110 is coupled to the connector 128 of the electronic device 120 or not. In other embodiments, however, the charger 124 may enter the second self-test mode according to an arranged schedule or by the user's input/control, or the charger 124 may enter the second self-test mode only when no cable plugs into the connector 128, or the charger 124 may enter the second self-test mode only when the AC/DC adapter 110 is coupled to the connector 128. These alternative designs shall fall within the scope of the present invention.

In addition, the above-mentioned first self-test mode and the second self-test mode can be sequentially executed, or be executed independently according to an arranged schedule or by the user's input/control.

Briefly summarized, in the embodiments of the present invention, the leakage current caused by the connector can be exactly determined. The user can therefore be notified to deal with this case, or the electronic device can communicate with the power adapter or USB host to disable or reduce the output voltage/current, thereby avoiding overheating of the connector.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device, comprising:
a connector, arranged for coupling to a power supply external to the electronic device, wherein the power supply is arranged to provide a supply voltage to the electronic device to charge a battery of the electronic device; and
a charger, coupled to the connector and selectively operated in a normal mode or a self-test mode, wherein when the charger operates in the normal mode, the charger is arranged for receiving the supply voltage via a power pin of the connector to charge the battery of the electronic device; and when the charger operates in the self-test mode, the charger provides a specific voltage to the power pin of the connector;
wherein the charger includes a detector to detect the current or voltage of at least one pin of the connector to generate a detecting result, and the supply voltage is set based on the detecting result.

2. The electronic device of claim 1, wherein when the detecting result is within a first range, the supply voltage is set to be a first value.

3. The electronic device of claim 1, wherein when the detecting result is within a second range, the supply voltage is set to be 5V.

4. The electronic device of claim 1, wherein when the detecting result is within a third range, the supply voltage is set to be in a range between 0 and 5V.

5. The electronic device of claim 1, wherein when the detecting result is above a first threshold, the supply voltage is set to be 0V.

6. The electronic device of claim 1, wherein the charger is allowed to operate in the self-test mode no matter whether the connector is coupled to the power supply or not.

7. The electronic device of claim 1, wherein the specific voltage is greater than the supply voltage provided by the power supply.

8. The electronic device of claim 1, further comprising:
a resistor, coupled between the charger and the connector; and a current detector, wherein when the charger operates in the self-test mode and provides the specific voltage to the power pin of the connector, the current detector detects a current flowing through the resistor to generate the detecting result.

9. The electronic device of claim 8, wherein when the current flowing through the resistor is lower than a second threshold, the charger switches from the self-test mode to the normal mode; and when the current flowing through the resistor is greater than the second threshold, the current detector notifies a controller of the electronic device to show a warning message, noise, or vibration or to notify the power supply to disable the supply voltage or reduce an output current, wherein the first threshold may be different from the second threshold.

10. The electronic device of claim 1, further comprising:
a voltage detector, for detecting a voltage of a non-power pin of the connector to generate the detecting result when the specific voltage is supplied to the power pin of the connector;
wherein when the voltage of the non-power pin is greater than a second threshold, the voltage detector notifies a controller of the electronic device to show a warning message, noise, or vibration or to notify the power supply to disable or reduce the supply voltage or an output current, wherein the first threshold may be different from the second threshold.

11. The electronic device of claim 1, further comprising:
a transistor, having a gate electrode, a first electrode and a second electrode, wherein the gate electrode is controlled by a control signal provided by the charger, the first electrode is coupled to a ground pin of the connector, and the second electrode is coupled to a ground of the electronic device; and
a resistor, coupled between the ground pin of the connector and the ground of the electronic device.

12. The electronic device of claim 11, wherein a default status of the transistor is off, and the electronic device further comprises:
a voltage detector, for detecting a voltage of a non-power pin of the connector to generate a detecting result when the specific voltage is supplied to the power pin of the connector;
wherein when the voltage of the non-power pin is greater than a second threshold, the voltage detector notifies a controller of the electronic device to show a warning message, noise, or vibration or to notify the power supply to disable or reduce the supply voltage or an output current; and when the voltage of the non-power pin is less than the second threshold, the charger sends the control signal to turn on the transistor, wherein the first threshold may be different from the second threshold.

13. A charger, arranged to be positioned in an electronic device and coupled to a connector of the electronic device, wherein the connector is arranged for coupling to a power supply external to the electronic device, and the charger is selectively operated in a normal mode or a self-test mode; wherein when the charger operates in the normal mode, the charger is arranged for receiving a supply voltage from the power supply via a power pin of the connector to charge a battery of the electronic device; and when the charger operates in the self-test mode, the charger provides a specific voltage to the power pin of the connector, wherein the charger includes a detector to detect the current or voltage of at least one pin of the connector to generate a detecting result, and the supply voltage is set based on the detecting result.

14. The charger of claim 13, wherein when the detecting result is within a first range, the supply voltage is set to be a first value.

15. The charger of claim 13, wherein when the detecting result is within a second range, the supply voltage is set to be 5V.

16. The charger of claim 13, wherein when the detecting result is within a third range, the supply voltage is set to be in a range between 0 and 5V.

17. The charger of claim 13, wherein when the detecting result is above a first threshold, the supply voltage is set to be 0V.

18. The charger of claim 13, wherein the charger is allowed to operate in the self-test mode no matter whether the connector is coupled to the power supply or not.

19. The charger of claim 13, wherein the specific voltage is greater than the supply voltage provided by the power supply.

20. The charger of claim 13, further comprising:
a voltage detector, for detecting a voltage of a non-power pin of the connector to generate the detecting result when the specific voltage is provided to the power pin of the connector;
wherein when the voltage of the non-power pin is greater than a second threshold, the voltage detector notifies a controller of the electronic device to show a warning message, noise, or vibration or to notify the power supply to disable or reduce the supply voltage or an output current, wherein the first threshold may be different from the second threshold.

21. An electronic device, comprising:
a connector, arranged for coupling to a power supply external to the electronic device, wherein the power supply is arranged to provide a supply voltage to the electronic device to charge a battery of the electronic device;
a charger, coupled to the connector and selectively operated in a normal mode or a self-test mode, for receiving the supply voltage via a power pin of the connector to charge the battery when the charger operates in the normal mode;
a transistor, having a gate electrode, a first electrode and a second electrode, wherein the gate electrode is controlled by a control signal provided by the charger, the first electrode is coupled to a ground pin of the connector, and the second electrode is coupled to a ground of the electronic device; and
a resistor, coupled between the ground pin of the connector and the ground of the electronic device;
wherein when the charger operates in the self-test mode, the charger provides a specific voltage to the power pin of the connector, the charger includes a detector to detect the current or voltage of at least one pin of the connector to generate a detecting result, and the supply voltage is set based on the detecting result.

22. The electronic device of claim 21, wherein a default status of the transistor is off, and the electronic device further comprises:
a voltage detector, for detecting a voltage of a non-power pin of the connector to generate the detecting result when the specific voltage is supplied to the power pin of the connector;
wherein when the voltage of the non-power pin is greater than a second threshold, the voltage detector notifies a controller of the electronic device to show a warning message, noise, or vibration or to notify the power supply to disable the supply voltage or reduce an output current; and when the voltage of the non-power pin is less than the second threshold, the charger sends the control signal to turn on the transistor, wherein the first threshold may be different from the second threshold.

23. The electronic device of claim 21, wherein when the detecting result is within a first range, the supply voltage is set to be a first value.

24. The electronic device of claim 21, wherein when the detecting result is within a second range, the supply voltage is set to be 5V.

25. The electronic device of claim 21, wherein when the detecting result is within a third range, the supply voltage is set to be in a range between 0 and 5V.

26. The electronic device of claim 21, wherein when the detecting result is above a threshold, the supply voltage is set to be 0V.

\* \* \* \* \*